(No Model.)
W. W. BAXTER.
CAR FENDER OR GUARD.
No. 484,989. Patented Oct. 25, 1892.
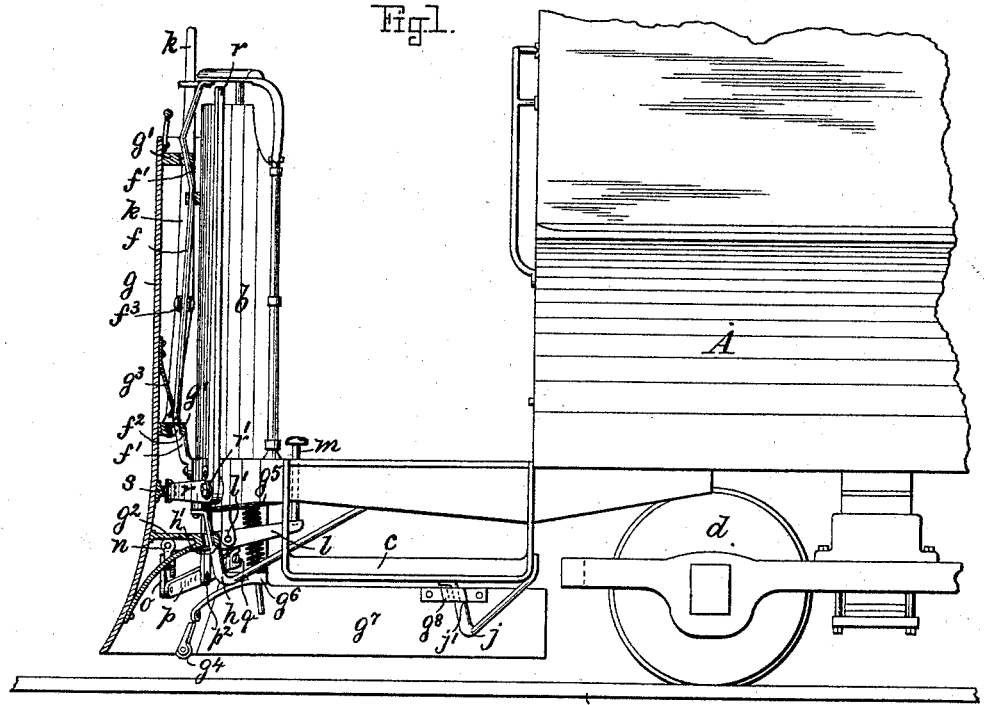
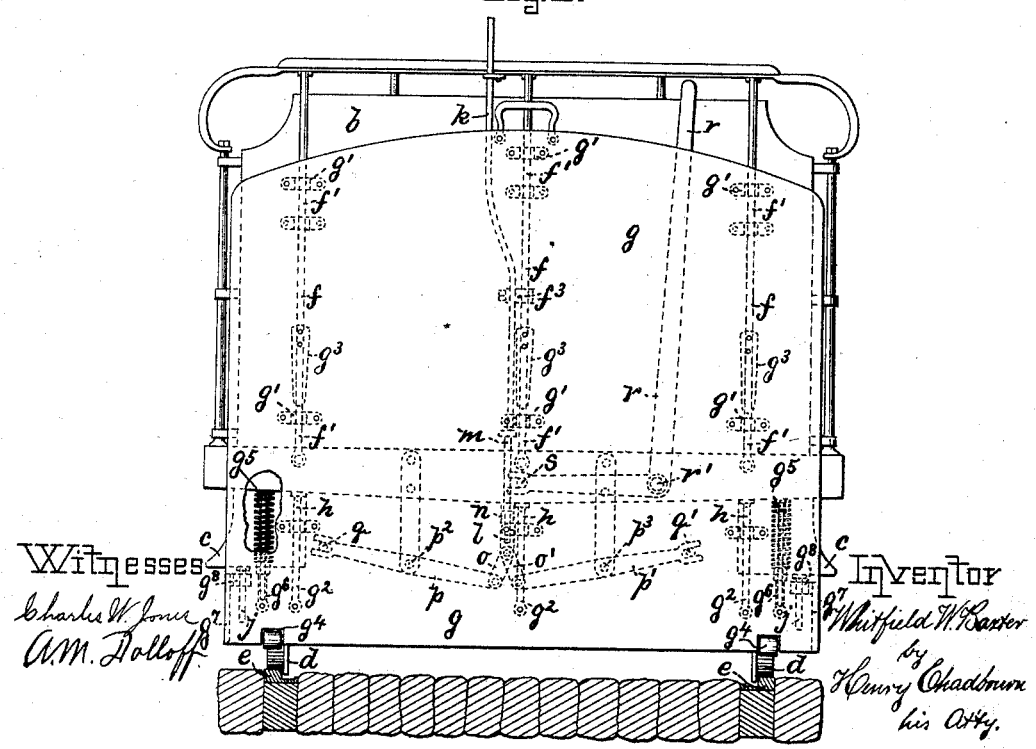
Witnesses
Charles W. Jones
A. M. Dolloff
Inventor
Whitfield W. Baxter
by
Henry Chadbourn
his Atty.

UNITED STATES PATENT OFFICE.

WHITFIELD W. BAXTER, OF BOSTON, MASSACHUSETTS.

CAR FENDER OR GUARD.

SPECIFICATION forming part of Letters Patent No. 484,989, dated October 25, 1892.

Application filed April 26, 1892. Serial No. 430,718. (No model.)

*To all whom it may concern:*

Be it known that I, WHITFIELD W. BAXTER, a citizen of the United States, residing at Boston, in the county of Suffolk and State of Massachusetts, have invented certain new and useful Improvements in Car Fenders or Guards; and I hereby declare the following to be a full, clear, and exact description of the invention, such as will enable others skilled in the art to which it appertains to make and use the same, reference being had to the accompanying drawings, forming a part of this specification.

This invention relates to improvements in railway-car fenders, and has for its object to prevent persons from going under the car when run into by the same.

It consists in providing a car having a fender or guard normally held suspended so that its lower edge will be a sufficient distance above the track and arranged to be automatically released and dropped when coming into contact with any object in front of the car, with means whereby it is held so suspended with a yielding pressure, also with means whereby the fender may be held firmly in its lowest position, also with means whereby the downward movement of the fender is accelerated, also with side wings and attached mechanism for operating the same, and also with means whereby the driver can release the fender and allow it to drop whenever he sees that there is danger of running over anything.

The invention is carried out as follows, reference being had to the accompanying drawings, forming an essential part of this specification, and whereon—

Figure 1 represents a portion of the forward end of a railway-car and showing a sectional view of my improved fender attached thereto. Fig. 2 represents the front elevation of the dasher of a car and the fender mounted thereon.

Similar letters refer to similar parts wherever they occur on the different parts of the drawings.

A represents the body, $b$ the dasher, $c\ c$ the steps, $d\ d$ the wheels, of a railway-car, and $e\ e$ the rails of a railway-track, as now in common use. To each of the dashers of the car are attached the rods $f\ f$, upon which is movably supported the fender $g$ by means of the brackets $g'\ g'$, attached to the rear of the fender. These rods are preferably made with inclined portions $f'\ f'$, upon which the brackets $g'\ g'$ move. The portions $f'\ f'$ of the rod $f$ are inclined from the top backward toward the car, so as to draw the fender backward when it is dropped from its upper to its lower position. To further support and strengthen the fender, I supply the body of the car with the brackets $h\ h$, which are inclined parallel to the portions $f'\ f'$ of the rod $f$ and upon which the brackets $g^2\ g^2$ on the fender $g$ are guided. The back part of the rods $f$ and brackets $h$ are provided with the respective ledges $f^2$ and $h'$, upon which the respective brackets $g'\ g^2$ are caused to rest by means of the spring $g^3$, which is attached to the fender and presses against the rod $f$, forcing the fender forward.

It will be seen that should the fender come into contact with any objects in front of the car it will be forced backward against the influence of the spring $g^3$, liberating the brackets $g'\ g^2$ from the ledges and allowing the fender to drop automatically, so that the rollers $g^4\ g^4$, attached to the lower end of the fender, will rest on the rails, and the space between the fender and pavements will be so reduced that it will be impossible for said object to get under the car and be run over by the wheels. The fender may be allowed to drop by gravity alone; but I prefer to supply it with suitable springs $g^5\ g^5$, as shown on the drawings, which springs are interposed between the under part of the car and the brackets $g^6\ g^6$, attached to the inside of the fender.

The fender is provided with wings $g^7\ g^7$, which extend backward from the fender and under the steps $c\ c$, one on either side of the car. These wings are provided with brackets $g^8\ g^8$, which are guided upon the brackets $j\ j$ and rest upon the ledges $j'\ j'$ on the brackets $j$ when the fender is in proper position, similar to the brackets $g'\ g^2$, above described. A lever $k$, fulcrumed to a block $f^3$, which is movable up and down upon the rod $f$, is pivoted at its lower end to one of the brackets $g'$ or to the fender proper and has its upper end projecting above the fender. By the use of the lever $k$ the driver is enabled to draw the fender backward until the brackets thereon are freed from the ledges on which they rest and allow the fender to drop to its lowest position. When the fender drops, it causes the block $f^3$ to be moved downward upon the rod $f$, from which position it is returned when the fender is raised.

If it is desired to hold the fender at its lowest position and to hold it with yielding pressure, I provide a treadle $l$ underneath the platform of the car, which treadle is fulcrumed at $l'$ to a bracket attached to the car and is operated by the foot of the driver by means of a push pin or rod $m$, passing through a perforation in the platform of the car and resting against the end of the treadle. The push-pin is made removable, so as to be removed when the platform through which it projects is the rear platform of the car in order not to operate the treadle. To the end of the treadle $l$ is pivoted the block $n$, and to this block is pivoted the links $o\ o'$, which connect the block with the respective levers $p\ p'$, fulcrumed, respectively, at $p^2\ p^3$ to brackets projecting from the under side of the platform of the car. These levers are forked at their ends and straddle pins $q\ q'$, projecting from the inside of the fender, substantially as shown on the drawings. Thus it will be seen that when the pin $m$ is forced downward by the driver it will cause the fender to be held in its lowest position through the connection above described between the pin and the fender. This construction prevents all liability of the fender rising after it has been lowered, as before described.

In order to raise the fender to its normal position after it has been lowered, I supply the car with the bell-crank lever $r$, fulcrumed at $r'$ to the dasher or to the front of the platform and having one arm of the lever projecting upward and forming a handle in easy reach of the driver, the other arm being forked and straddling a pin $s$, attached to inside of the fender. By operating the lever $r$ the fender can be raised until the spring $g^3$ draws the fender forward and locks it in its upper position, as described.

If so desired, I may dispense with the mechanism described for holding the fender in its lowest position and depend upon the spring $g^5\ g^5$ to prevent the same from accidentally rising; also, said mechanism may be varied within the scope of mechanical skill without departing from my invention.

Any portion or the whole of the exposed surface of the fender $g$ may, if so desired, be upholstered or provided with spring-cushions, so as to present an elastic and soft surface to come in contact with a person when struck by the car.

If it is desired to furnish a guard to prevent persons from falling under the car from the side, the wings $g^7\ g^7$ may be extended on both sides of the car, either in one piece or in sections, so that the entire car or the trucks thereof may be surrounded with a fender.

It is not essential that the fender should be of such a height as the one shown on the drawings, as the same might vary in height and extend simply to a level with the under side of the platform, if so desired; but I prefer to have it extend to the top of the dasher, or nearly so, as shown on the drawings.

Having thus fully described the nature, construction, and operation of my invention, I wish to secure by Letters Patent and claim—

1. The combination, with a railway-car, rods upon the forward end thereof, a fender supported by and movable up and down upon the rod, brackets upon the fender, and ledges upon the rods, upon which the brackets rest to hold the fender in its upper position, of a spring to draw the fender forward and to hold the brackets upon the ledges with a yielding pressure, for the purpose set forth.

2. The combination, with a railway-car, rods upon the car, and a fender supported by and movable up and down upon the rods, of a push-pin projecting through a perforation in the platform of the car and a series of levers between the push-pin and the fender, whereby the fender is held in its lowest position by pressure exerted upon the push-pin, for the purpose set forth.

3. The combination, with a railway-car, rods upon the car, having ledges for the purpose set forth, and a fender supported by and movable up and down upon the rods, of springs interposed between the fender and car to accelerate the downward movements of the fender and to hold the same downward with a yielding pressure, for the purpose set forth.

4. The combination, with a railway-car, rods upon the car, and a fender supported by and movable up and down upon the rods, of side wings upon the fender extending backward under the steps and brackets upon the steps, upon which the wings are supported and movable up and down, for the purpose set forth.

5. The combination, with a railway-car, rods upon the car, having ledges for retaining a fender in a raised position above the track, and a fender supported by and movable up and down upon the rods, of a lever whereby the fender may be released from the ledges and allowed to drop to its lowest position, for the purpose set forth.

In testimony whereof I have signed my name in the presence of two subscribing witnesses.

WHITFIELD W. BAXTER.

In presence of—
HENRY CHADBOURNE,
EDWARD L. ORCUTT.